United States Patent
Leiber et al.

(10) Patent No.: US 12,227,151 B2
(45) Date of Patent: Feb. 18, 2025

(54) PACKAGING FOR A BRAKE SYSTEM

(71) Applicant: IPGATE AG, Pfäffikon (CH)

(72) Inventors: Thomas Leiber, Rogoznica (HR); Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 621 days.

(21) Appl. No.: 17/429,527

(22) PCT Filed: Mar. 21, 2019

(86) PCT No.: PCT/EP2019/057123
§ 371 (c)(1),
(2) Date: Aug. 9, 2021

(87) PCT Pub. No.: WO2020/164748
PCT Pub. Date: Aug. 20, 2020

(65) Prior Publication Data
US 2022/0153240 A1    May 19, 2022

(30) Foreign Application Priority Data
Feb. 12, 2019 (DE) ............... 20 2019 101 586.1

(51) Int. Cl.
*B60T 13/74* (2006.01)
*B60T 7/04* (2006.01)
(Continued)

(52) U.S. Cl.
CPC ............ *B60T 13/142* (2013.01); *B60T 7/042* (2013.01); *B60T 13/662* (2013.01);
(Continued)

(58) Field of Classification Search
CPC ...... B60T 8/368; B60T 13/686; B60T 13/745; B60T 11/26; B60T 13/142; B60T 7/042; B60T 13/662
See application file for complete search history.

(56) References Cited

U.S. PATENT DOCUMENTS 5,588,718 A    12/1996   Winner et al.
5,986,368 A *  11/1999   Wetzel ............ H02K 5/225
                                                  310/71
(Continued)

FOREIGN PATENT DOCUMENTS

CN    101039829 A   9/2007
CN    101341056 A   1/2009
(Continued)

OTHER PUBLICATIONS

Office Action issued Apr. 20, 2023 in European Aplication No. 19714344.9-1012 with English Translation.
(Continued)

*Primary Examiner* — Bradley T King
(74) *Attorney, Agent, or Firm* — Panitch Schwarze Belisario & Nadel LLP

(57) ABSTRACT

An actuation device for a hydraulically operating brake system may include: a master cylinder in a housing and having at least one piston, to which a force can be applied by, e.g., a brake pedal; pressure supply device(s), at least one of which is a piston pump or double stroke piston pump having a piston and driven by an electromotive drive, the drive moving the piston directly or via a step-up gear; at least one valve assembly with magnetic valves; and at least one electronic control and regulating unit. The brake system has at least two hydraulic circuits, and a pressure change can be carried out in at least one wheel brake via the pressure supply device(s). A first housing or module, hydraulically connected to the housing, may contain the valve assembly and the at least one piston and pressure chamber of at least one of the pressure supply devices.

23 Claims, 5 Drawing Sheets

Figure 1:
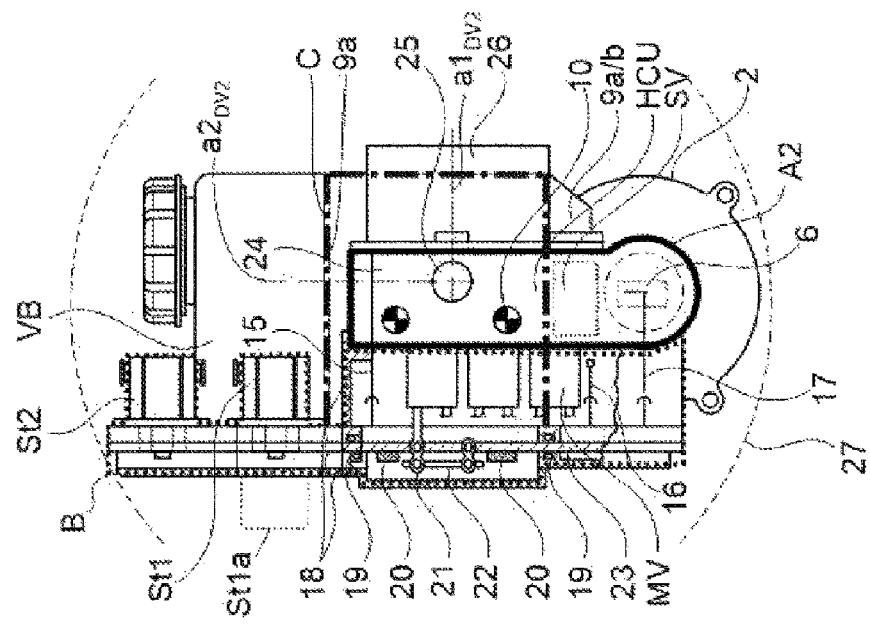

(51) Int. Cl.
  *B60T 13/14* (2006.01)
  *B60T 13/66* (2006.01)
  *B60T 13/68* (2006.01)
  *B60T 8/36* (2006.01)

(52) U.S. Cl.
  CPC .......... *B60T 13/686* (2013.01); *B60T 13/745* (2013.01); *B60T 8/368* (2013.01)

(56) References Cited

U.S. PATENT DOCUMENTS

| | | | |
|---|---|---|---|
| 5,988,767 A * | 11/1999 | Inoue | B60T 8/368 303/DIG. 10 |
| 6,042,200 A * | 3/2000 | Hosoya | B60T 8/368 303/119.3 |
| 6,517,170 B1 | 2/2003 | Hofsaess et al. | |
| 9,776,604 B2 * | 10/2017 | Lee | B60T 1/10 |
| 10,173,659 B2 | 1/2019 | Kim et al. | |
| 10,513,249 B2 | 12/2019 | Kim | |
| 10,688,979 B2 | 6/2020 | Leiber et al. | |
| 11,554,765 B2 * | 1/2023 | Leiber | B60T 17/02 |
| 11,565,678 B2 * | 1/2023 | Zander | F15B 13/0814 |
| 2008/0246334 A1 | 10/2008 | Drescher | |
| 2009/0115247 A1 | 5/2009 | Leiber et al. | |
| 2010/0001577 A1 | 1/2010 | Hatano | |
| 2012/0235469 A1 | 9/2012 | Miyazaki et al. | |
| 2013/0103277 A1 | 4/2013 | Attallah et al. | |
| 2013/0213025 A1 | 8/2013 | Linden | |
| 2014/0203626 A1 | 7/2014 | Biller et al. | |
| 2014/0216866 A1 | 8/2014 | Feigel et al. | |
| 2015/0203085 A1 * | 7/2015 | Maruo | B60T 8/3685 303/10 |
| 2015/0283987 A1 | 10/2015 | Bareiss | |
| 2016/0009263 A1 | 1/2016 | Feigel et al. | |
| 2016/0009267 A1 | 1/2016 | Lesinski, Jr. | |
| 2016/0023644 A1 | 1/2016 | Feigel et al. | |
| 2016/0107629 A1 * | 4/2016 | Han | B60L 7/26 303/113.2 |
| 2016/0185329 A1 * | 6/2016 | Lee | B60T 8/4081 303/10 |
| 2016/0221562 A1 * | 8/2016 | Leiber | B60T 8/4081 |
| 2016/0311422 A1 | 10/2016 | van Zanten et al. | |
| 2016/0375886 A1 | 12/2016 | Jung | |
| 2017/0015293 A1 | 1/2017 | Yagashira et al. | |
| 2017/0106843 A1 | 4/2017 | Jeong | |
| 2017/0158184 A1 | 6/2017 | Choi et al. | |
| 2017/0182988 A1 * | 6/2017 | Kawakami | B60T 11/22 |
| 2017/0327098 A1 | 11/2017 | Leiber et al. | |
| 2017/0334417 A1 | 11/2017 | Choi et al. | |
| 2017/0361825 A1 | 12/2017 | Drumm et al. | |
| 2018/0065605 A1 * | 3/2018 | Leiber | B60T 13/745 |
| 2018/0065609 A1 * | 3/2018 | Leiber | B60T 13/686 |
| 2018/0126970 A1 | 5/2018 | Leiber et al. | |
| 2018/0215366 A1 * | 8/2018 | Leiber | B60T 13/58 |
| 2018/0334149 A1 * | 11/2018 | Feigel | B60T 13/148 |
| 2019/0031165 A1 | 1/2019 | Besier et al. | |
| 2019/0100182 A1 * | 4/2019 | Leiber | B60T 13/142 |
| 2019/0344769 A1 | 11/2019 | Zimmermann et al. | |
| 2020/0047731 A1 * | 2/2020 | Reuter | B60T 13/146 |
| 2020/0079335 A1 * | 3/2020 | Linhoff | B60T 8/321 |
| 2020/0079338 A1 | 3/2020 | Roh | |
| 2020/0139948 A1 | 5/2020 | Leiber et al. | |
| 2020/0139949 A1 * | 5/2020 | Dolmaya | B60T 8/4081 |
| 2020/0172068 A1 | 6/2020 | Leiber et al. | |
| 2020/0406880 A1 | 12/2020 | Zimmermann et al. | |
| 2021/0053540 A1 * | 2/2021 | Besier | B60T 13/58 |
| 2021/0094524 A1 * | 4/2021 | Wetzel | H02K 5/225 |
| 2021/0179051 A1 | 6/2021 | Alford et al. | |
| 2021/0245725 A1 * | 8/2021 | Courth | B60T 17/221 |
| 2021/0309197 A1 * | 10/2021 | Weh | B60T 8/368 |
| 2022/0041150 A1 | 2/2022 | Leiber | |
| 2022/0135013 A1 | 5/2022 | Leiber et al. | |
| 2022/0314813 A1 | 10/2022 | Koglsperger et al. | |
| 2023/0356700 A1 * | 11/2023 | Jia | B60T 8/4081 |
| 2024/0001899 A1 * | 1/2024 | Stanojkovski | B60T 13/686 |

FOREIGN PATENT DOCUMENTS

| | | |
|---|---|---|
| CN | 101987616 A | 3/2011 |
| CN | 102414063 A | 4/2012 |
| CN | 102616229 A | 8/2012 |
| CN | 102639370 A | 8/2012 |
| CN | 102822025 A | 12/2012 |
| CN | 103253251 A | 8/2013 |
| CN | 103318160 A | 9/2013 |
| CN | 103347754 A | 10/2013 |
| CN | 103874609 A | 6/2014 |
| CN | 104640755 A | 5/2015 |
| CN | 107107885 A | 8/2017 |
| CN | 107428325 A | 12/2017 |
| CN | 107472232 A | 12/2017 |
| DE | 4340467 A1 | 6/1995 |
| DE | 19914403 A1 | 10/2000 |
| DE | 10025038 A1 | 11/2001 |
| DE | 10028092 A1 | 12/2001 |
| DE | 10158065 A1 | 6/2003 |
| DE | 10259489 A1 | 7/2004 |
| DE | 10319338 A1 | 11/2004 |
| DE | 102005017958 A1 | 4/2006 |
| DE | 102005055751 A1 | 11/2006 |
| DE | 102007016948 B3 | 8/2008 |
| DE | 102008015241 A1 | 9/2008 |
| DE | 102009008944 A1 | 8/2010 |
| DE | 102009055721 A1 | 6/2011 |
| DE | 102011086258 A1 | 5/2012 |
| DE | 102012210809 A1 | 1/2013 |
| DE | 102012213216 A1 | 2/2013 |
| DE | 102012217825 A1 | 4/2014 |
| DE | 102012025290 A1 | 6/2014 |
| DE | 102013217954 A1 | 3/2015 |
| DE | 102013017205 A1 | 4/2015 |
| DE | 102013224783 A1 | 6/2015 |
| DE | 112013004634 T5 | 6/2015 |
| DE | 102014225962 A1 | 6/2016 |
| DE | 202015008975 U1 | 6/2016 |
| DE | 102015103858 A1 | 9/2016 |
| DE | 102015104246 A1 | 9/2016 |
| DE | 112015002162 T5 | 1/2017 |
| DE | 102016222765 A1 | 5/2017 |
| DE | 102016105232 A1 | 9/2017 |
| DE | 102016203563 A1 | 9/2017 |
| DE | 102017219257 A1 | 4/2018 |
| DE | 102016225537 A1 | 6/2018 |
| DE | 102017200955 A1 | 7/2018 |
| DE | 102017219598 A1 | 7/2018 |
| DE | 102017222435 A1 | 7/2018 |
| DE | 102017222450 A1 | 7/2018 |
| DE | 102017207954 A1 | 11/2018 |
| DE | 102017113563 A1 | 12/2018 |
| DE | 102017212016 A1 | 1/2019 |
| DE | 102018111126 A1 | 11/2019 |
| DE | 102019219158 A1 | 6/2021 |
| EP | 280740 A1 | 9/1988 |
| EP | 2881292 A1 | 6/2015 |
| EP | 2883766 A1 | 6/2015 |
| EP | 2744691 B1 | 7/2015 |
| EP | 3225480 A1 | 10/2017 |
| EP | 3225481 A1 | 10/2017 |
| EP | 3333031 A1 | 6/2018 |
| GB | 589075 A | 6/1947 |
| GB | 8514135 | 7/1985 |
| GB | 2160273 A | 12/1985 |
| GB | 8703148 | 2/1987 |
| GB | 2186932 A | 8/1987 |
| JP | H8-506301 A | 7/1996 |
| JP | H8282459 A | 10/1996 |
| JP | H10329699 A | 12/1998 |
| JP | H11-348751 A | 12/1999 |
| JP | 2001097201 A | 4/2001 |
| JP | 2001219845 A | 8/2001 |
| JP | 20020337679 A | 11/2002 |
| JP | 2002541010 A | 12/2002 |
| JP | 2006-151342 A | 6/2006 |
| JP | 2013541462 A | 11/2013 |
| KR | 20090077182 A | 7/2009 |

(56) References Cited

FOREIGN PATENT DOCUMENTS

| KR | 20170012348 A | 2/2017 |
|---|---|---|
| WO | 2006111393 A1 | 10/2006 |
| WO | 2012034661 A1 | 3/2012 |
| WO | 2012059175 A1 | 5/2012 |
| WO | 2012146461 A1 | 11/2012 |
| WO | 2013010554 A1 | 1/2013 |
| WO | 2013037568 A1 | 3/2013 |
| WO | 2014135446 A2 | 9/2014 |
| WO | 2015024795 A1 | 2/2015 |
| WO | 2015032637 A1 | 3/2015 |
| WO | 2015106892 A1 | 7/2015 |
| WO | 2016012331 A1 | 1/2016 |
| WO | 2016023994 A1 | 2/2016 |
| WO | 2016023995 A1 | 2/2016 |
| WO | 2016120292 A1 | 8/2016 |
| WO | 2016146223 A2 | 9/2016 |
| WO | 2017055152 A1 | 4/2017 |
| WO | 2017148968 A1 | 9/2017 |
| WO | 2017153072 A1 | 9/2017 |
| WO | 2018011021 A1 | 1/2018 |
| WO | 2018019671 A1 | 2/2018 |
| WO | 2018130406 A1 | 7/2018 |
| WO | 2018130482 A1 | 7/2018 |
| WO | 2018130483 A1 | 7/2018 |
| WO | 2018210534 A1 | 11/2018 |
| WO | 2018234387 A1 | 12/2018 |
| WO | 2019002475 A1 | 1/2019 |
| WO | 2019215283 A1 | 11/2019 |

OTHER PUBLICATIONS

Office Action issued Mar. 28, 2023 in Japanese Aplication No. 2021-547138 with English Translation.
Office Action (First Examination Report) issued on Feb. 17, 2023, by the Intellectual Property India in corresponding India Patent Application No. 202117038290 with English Translation.
Office Action issued May 16, 2023 in Chinese Application No. 202080021255.X with English Translation.
Office Action issued May 17, 2023 in Chinese Application No. 202080021265.3 with English Translation.
Office Action issued May 22, 2023 in Chinese Application No. 202080022277.8 with English Translation.
Office Action issued Dec. 28, 2023 in U.S. Appl. No. 17/429,593.
Office Action issued Oct. 24, 2023 in U.S. Appl. No. 17/426,615.
Notice of Allowance issued Jan. 24, 2024 in U.S. Appl. No. 17/429,608.
Corrected Notice of Allowance issued Feb. 1, 2024 in U.S. Appl. No. 17/429,608.
Office Action issued Mar. 16, 2022 in U.S. Appl. No. 17/429,620.
Office Action issued Jan. 25, 2024 n European Aplication No. 20706153.2-1012 with English Translation.
Office Action issued Feb. 29, 2024 in U.S. Appl. No. 17/429,423.
Office Action issued Nov. 24, 2023 in U.S. Appl. No. 17/429,562.
Notice of Allowance issued Mar. 6, 2024 in U.S. Appl. No. 17/429,615.
Office Action issued Dec. 7, 2023 in U.S. Appl. No. 17/429,578.
Int'l Search Report and Written Opinion issued Oct. 22, 2019 in Int'l Application No. PCT/EP2019/068596, English translation of Int'l Search Report only.
Int'l Search Report and Written Opinion issued Oct. 30, 2019 in Int'l Application No. PCT/EP2019/057123, English translation of Int'l Search Report only.
Int'l Search Report and Written Opinion issued Nov. 4, 2019 in Int'l Application No. PCT/EP2019/068592, English translation of Int'l Search Report only.
Int'l Search Report and Written Opinion issued Apr. 1, 2020 in Int'l Application No. PCT/EP2020/053626, English translation of Int'l Search Report only.
Int'l Search Report and Written Opinion issued Apr. 28, 2020 in Int'l Application No. PCT/EP2020/053609, English translation of Int'l Search Report only.
Int'l Search Report and Written Opinion issued Apr. 28, 2020 in Int'l Application No. PCT/EP2020/053613, English translation of Int'l Search Report only.
Int'l Search Report and Written Opinion issued May 19, 2020 in Int'l Application No. PCT/EP2020/053665, English translation of Int'l Search Report only.
Int'l Search Report and Written Opinion issued May 19, 2020 in Int'l Application No. PCT/EP2020/053668, English translation of Int'l Search Report only.
Int'l Search Report and Written Opinion issued Jun. 5, 2020 in Int'l Application No. PCT/EP2020/053667, English translation of Int'l Search Report only.
Int'l Search Report and Written Opinion issued Oct. 9, 2020 in Int'l Application No. PCT/EP2020/053666, English translation of Int'l Search Report only.
Search Report issued Dec. 20, 2019 in DE Application No. 10 2019 103 464.7.
Search Report issued Jan. 3, 2020 in DE Application No. 10 2019 103 483.3.
Search Report issued Apr. 2, 2020 in DE Application No. 10 2019 107 334.0.
Office Action issued Mar. 14, 2024 in U.S. Appl. No. 17/429,562.
Office Action issued Mar. 14, 2024 in U.S. Appl. No. 17/429,578.
Notice of Allowance issued Mar. 27, 2024 in U.S. Appl. No. 17/429,608.
Office Action issued Apr. 2, 2024 in JP Application No. 2021-547135 with English Translation.
Office Action issued Mar. 12, 2024 in JP Application No. 2021-547136 with English Translation.
Office Action issued Aug. 5, 2024 in U.S. Appl. No. 17/429,403.
Notice of Allowance issued Aug. 21, 2024, in U.S. Appl. No. 17/429,593.
Office Action issued Feb. 15, 2024 in European Application No. 19 742 145.6-1012 with English translation.
Office Action issued Mar. 12, 2024 in JP Application No. 2021-547137 with English Translation.
Office Action issued Jun. 3, 2024 in U.S. Appl. No. 17/429,380.

* cited by examiner

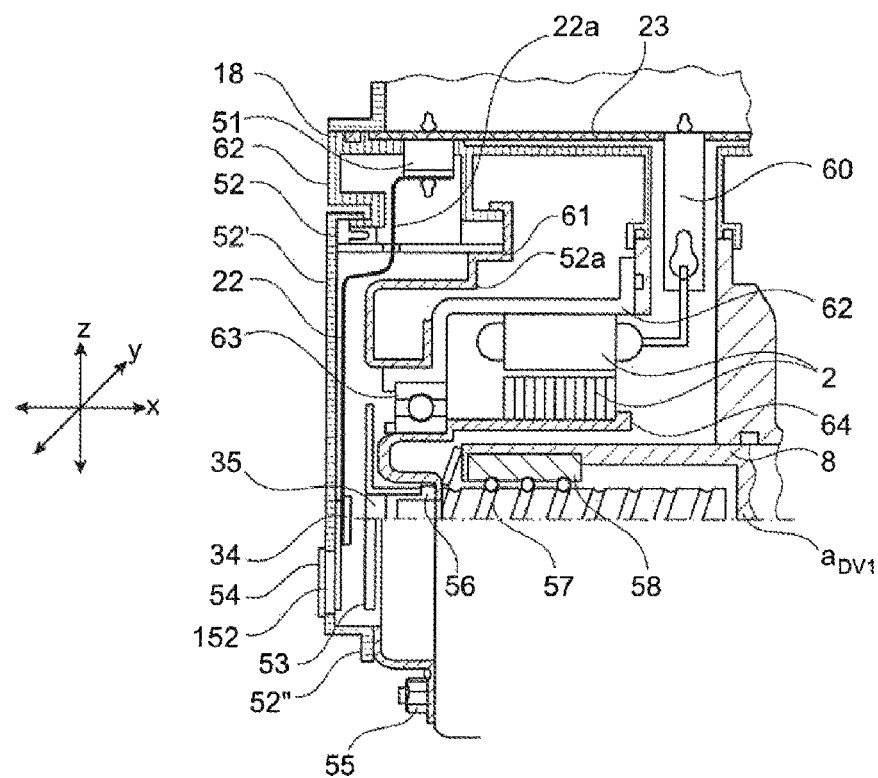
Fig. 6
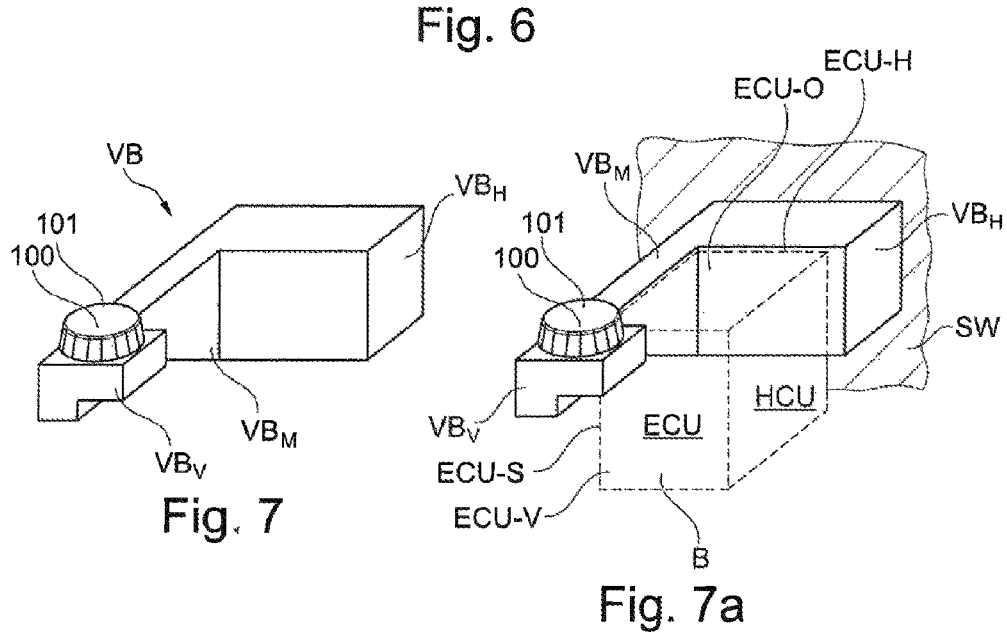
Fig. 7
Fig. 7a

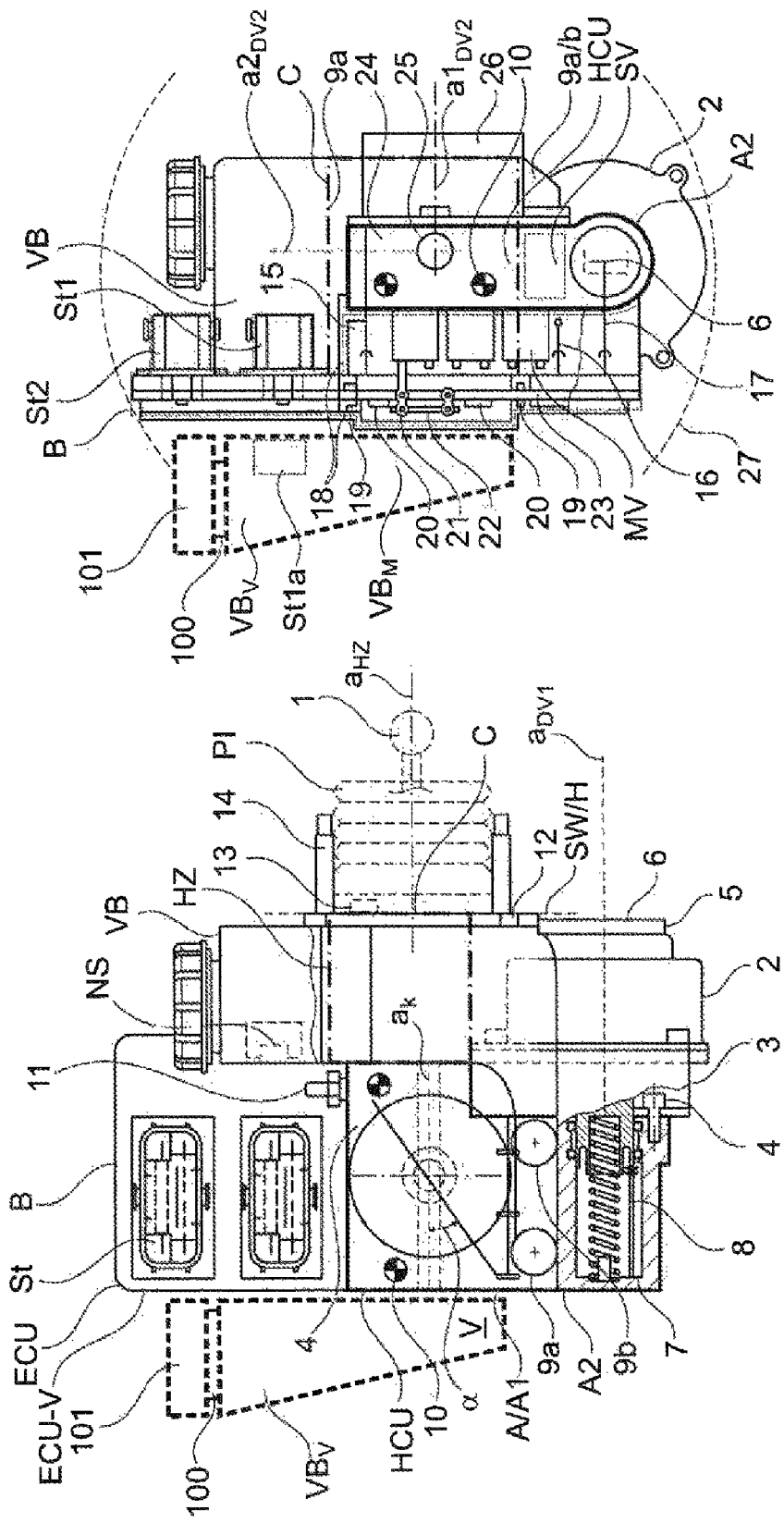

PACKAGING FOR A BRAKE SYSTEM

CROSS-REFERENCE TO RELATED APPLICATION

This application is a Section 371 of International Application No. PCT/EP2019/057123, filed Mar. 21, 2019, which was published in the German language on Aug. 20, 2020 under International Publication No. WO 2020/164748 A1, which claims priority under 35 U.S.C. § 119 (b) to German Patent Application No. 20 2019 101 586.1, filed Feb. 12, 2019, the disclosures of which are incorporated herein by reference.

The present invention relates to an actuating system having the features of one or more of the accompanying claims.

PRIOR ART

The packaging or structural volume of brake systems is of great importance. In particular in the case of systems with SAD (semi-automated) and FAD (fully automated driving), many variants from level 2 with tandem master brake cylinder (THZ) or single master brake cylinder (HZ) to level 5 without THZ or HZ must be taken into consideration. In particular, 3-5 concepts with 2 pressure supplies or pressure supply devices (DV) are difficult to implement in terms of packaging with a small construction volume. Examples of packaging are known from EP 2744691 with a vertical arrangement of the pressure supply (DV) with respect to the master brake cylinder (HZ) axis and DE 20160321161604 with a parallel arrangement of the pressure supply device with respect to the master brake cylinder (HZ) axis, which require a smaller structural width. Redundant pressure supplies allow systems with only one master brake cylinder, because the probability of failure of two pressure supply devices is very low and is practically limited to the failure of the on-board electrical system. Such a system is described in DE 102017222450. Here, the master brake cylinder HZ still allows emergency driving with the brake, for example to the towing vehicle.

DE102016105232 A1 has already disclosed a packaging with a small structural volume in the case of which an integrated redundant pressure supply composed of at least one pressure supply device, with valves, in particular solenoid valves combined in a hydraulic unit, with at least one electronic open-loop and closed-loop control unit, at least one reservoir, and a master brake cylinder is combined in one module.

OBJECT OF THE INVENTION

It is the object of the present invention to provide modular packaging for various systems with a small structural volume.

Advantages of the Invention

Said object and further advantages may be achieved by means of a brake system according to one or more of the accompanying claims.

A packaging with a small structural volume is proposed, having an integrated redundant pressure supply DV composed of at least one pressure supply device, with valves, in particular solenoid valves combined in a hydraulic unit, with at least one electronic open-loop and closed-loop control unit, at least one reservoir, with a single master brake cylinder and pedal stroke sensors and travel simulator with piston. The invention provides different variants of modular actuation systems for brake systems which comprise as many identical parts as possible for manufacturing and assembly.

Possible variants according to the invention are preferably:

Variant a:
is a 2-box solution with two modules, wherein the first module comprises the pressure supply device (DV1), master brake cylinder (HZ) with travel simulator (WS), valve arrangement (HCU), open loop and closed-loop control unit (ECU) and reservoir (VB), and the second module comprises ESP or ABS, Variant b:
is a 1-box solution with only one module, which comprises at least one pressure supply device (DV1, DV2), the valve arrangement (HCU), open-loop and closed-loop control unit (ECU) and reservoir (VB), Variant c:
is a 1-box solution with only one module, which has the pressure supply device, wherein at least one pressure supply device is of redundant configuration, that is to say for example with a double on-board electrical system connection or redundant phase windings, and wherein the valve arrangement (HCU), open-loop and closed-loop control unit (ECU) and reservoir (VB) are likewise included in the module.

Variant d:
the same module as with variant c., but with an open-loop and closed-loop control unit of fully or partially redundant configuration.

Variant e:
is a 2-box solution with two modules, wherein the first module comprises a pressure supply device (DV1, DV2), valve arrangement (HCU), open-loop and closed-loop control unit (ECU) and reservoir (VB), wherein the open-loop and closed-loop control unit (ECU) is a fully or partially redundant configuration, and the second module comprises either the master brake cylinder (HZ) with optional travel simulator (WS).

Variant f:
first module as in variant e, wherein, in the second module, instead of a master brake cylinder, there is or are arranged an electronic brake pedal with travel simulator WS or only a brake switch for level V.

The housings described below are advantageously used here. These housings form subassemblies which, when assembled, form the entire unit for installation into the vehicle:

Housing A: comprises the valve arrangement (HCU) for the pressure supply devices DV1 and DV2 with, for example, valves (V), solenoid valves (MV) and one or more pressure transducers (DG).

Housing B: comprises the open-loop and closed-loop control unit ECU without redundancy with a main plug connector or with partial or full redundancy with two plug connectors to the on-board electrical system.

Housing C: for master brake cylinder HZ with pedal stroke sensors and small sensor ECU and reservoir VB for variant e. The master brake cylinder HZ also comprises the pedal interface (PI) to the brake pedal and also the travel simulator with piston and spring.

The housing A (HCU) is preferably manufactured from an extruded molded piece, which is very highly suitable for fastening and assembly using calking technology. Here, the pressure supply DV1 with piston drive and ball-screw drive KGT is to be integrated with the motor, and likewise pressure supply DV2 with small piston pump of ABS/ESP, and furthermore the valves and solenoid valves. Here, pressure supply DV1 is arranged for example parallel to the master brake cylinder (HZ) axis, and the piston pump of pressure supply DV2 is arranged perpendicular to the pressure supply DV1. Aside from the pressure supply DV1, pressure supply DV2 corresponds to the proven technology of ABS/ESP, and it is thus inexpensive with a small structural volume. Alternatively, a gear or vane pump with continuous delivery action may be used. The interface to the open-loop and closed-loop control unit ECU is also similar to ABS/ESP. The master brake cylinder HZ with all of the abovementioned components (housing C) can be screwed to housing A—this applies to all variants except for variants e and f. Here, the housing C is mounted, as a subassembly separate from the unit, onto the bulkhead, and the hydraulic line from the master brake cylinder HZ is connected to housing A. In the variants a. and d., the reservoir VB is situated in the housing A with two connections to the brake circuits or with an additional connection to the pressure supply DV. The float in the reservoir VB comprises a target with a connection to the sensor element in the open-loop and closed-loop control unit ECU. The motor may preferably be connected to the housing A via an intermediate housing, which is preferably composed of plastic. The sensor required for commutation of the motor and piston position may preferably be attached to the motor housing on the side situated opposite the piston along the motor axis, and connected to the open-loop and closed-loop control unit ECU. Here, the sensor is situated in an additional housing in relation to the ECU. As redundancy for the electrical connection of the magnet coil of the solenoid valve, a small additional circuit board in relation to the main circuit board PCB may be used for a second connection of the magnet coil. The housing A may also be divided into a housing A1 for the pressure supply DV2 with a small pump and with the valve MV, as well as pressure transducers DG and other components, and a housing A2 for the pressure supply DV1 with motor and housing and piston with ball screw drive KGT and valves with connection to the reservoir VB.

The illustrated packaging meets the requirements for modularity and small structural volume and is also very inexpensive in terms of costs and weight.

Through the provision of a special sensor housing, it is possible for the manufacturing-related tolerances of the housing of the unit according to the invention to be easily compensated, such that the motor sensor can be reliably placed at the position intended for it.

Furthermore, owing to a special design of the reservoir, its filler neck or opening may advantageously be arranged on or in front of the front side of the housing of the electronic control unit or the actuating device, so as to be easily accessible. Owing to the connection, which leads laterally past the housing of the electronic control unit, of the front filler neck to the rear of the housing of the control unit, the reservoir itself can expediently be arranged behind the control unit. The lateral or central region of the reservoir can advantageously be designed to be narrow, such that the actuating device is hereby no wider, or only insignificantly wider, than in the case of a conventional reservoir.

Different variants will be discussed in more detail below on the basis of drawings.

Figure 2:
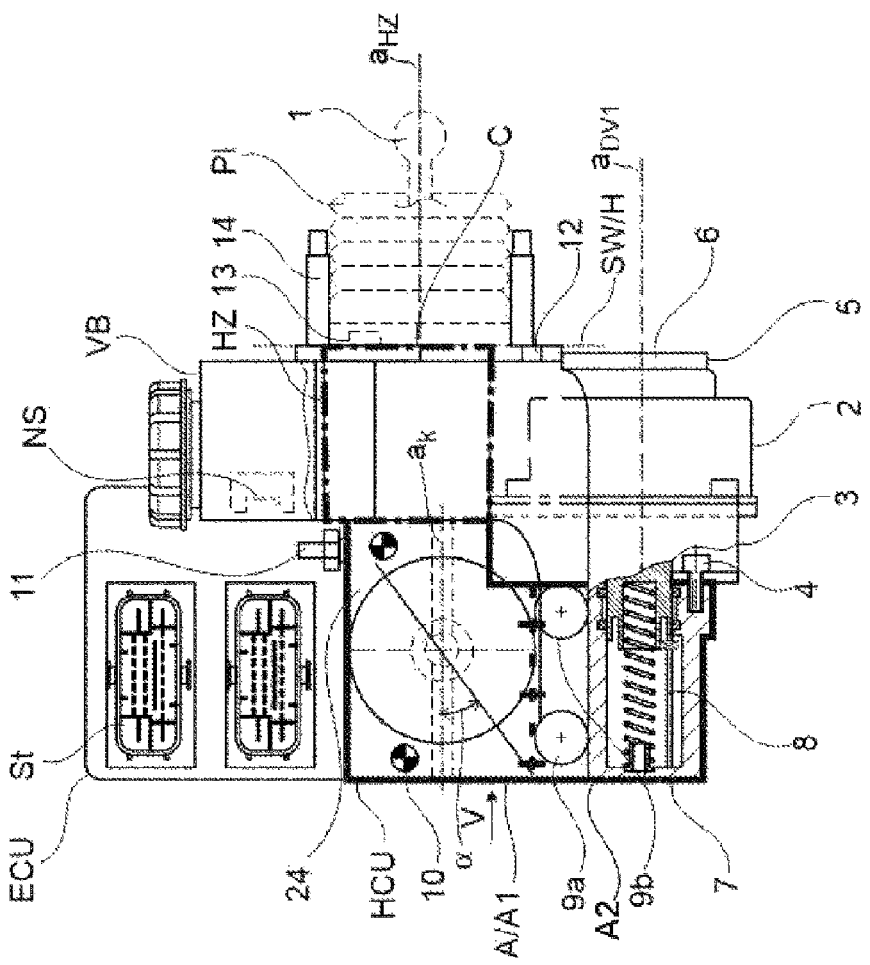
Figure 3:
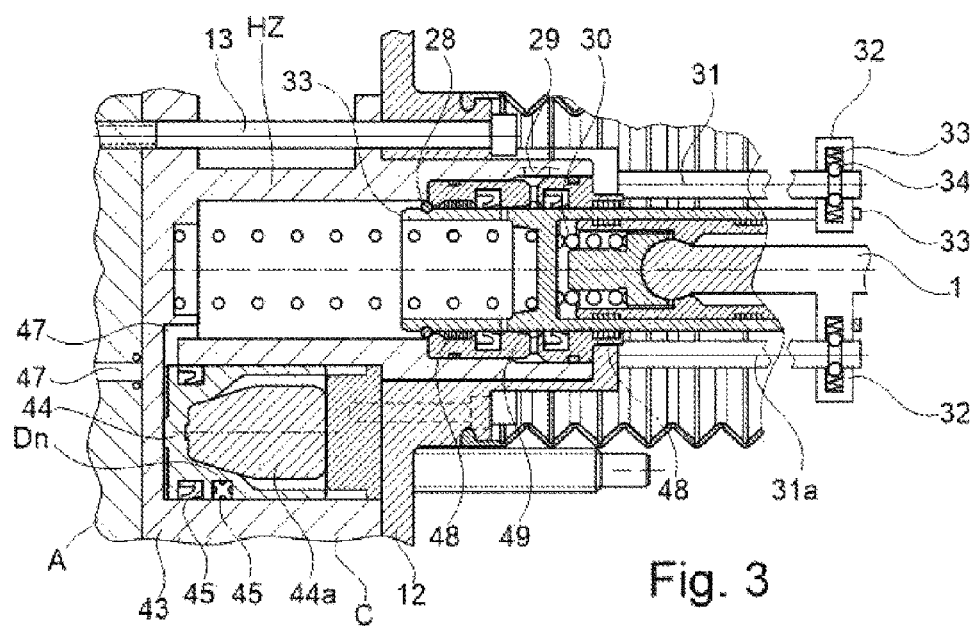
Figure 4:
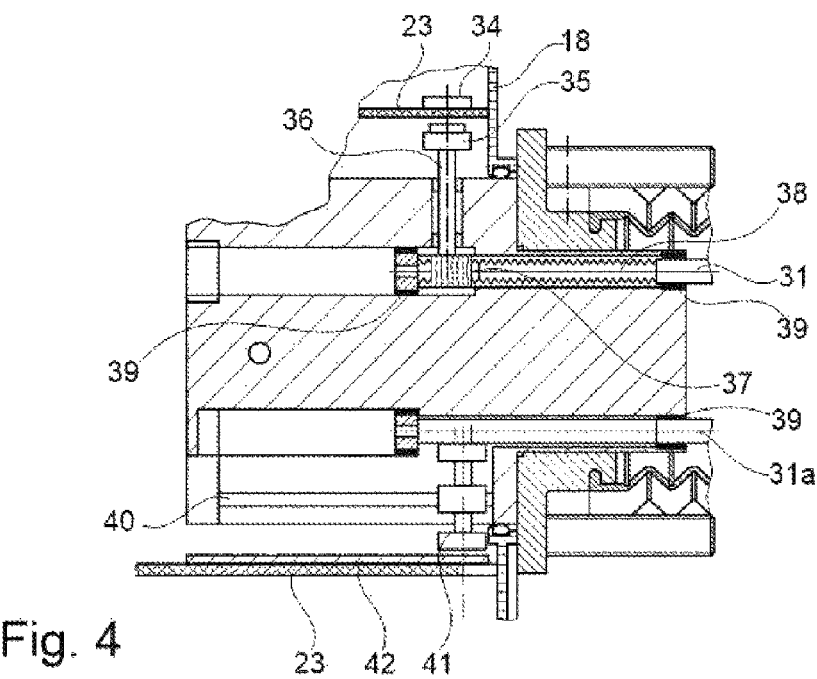
Figure 5:
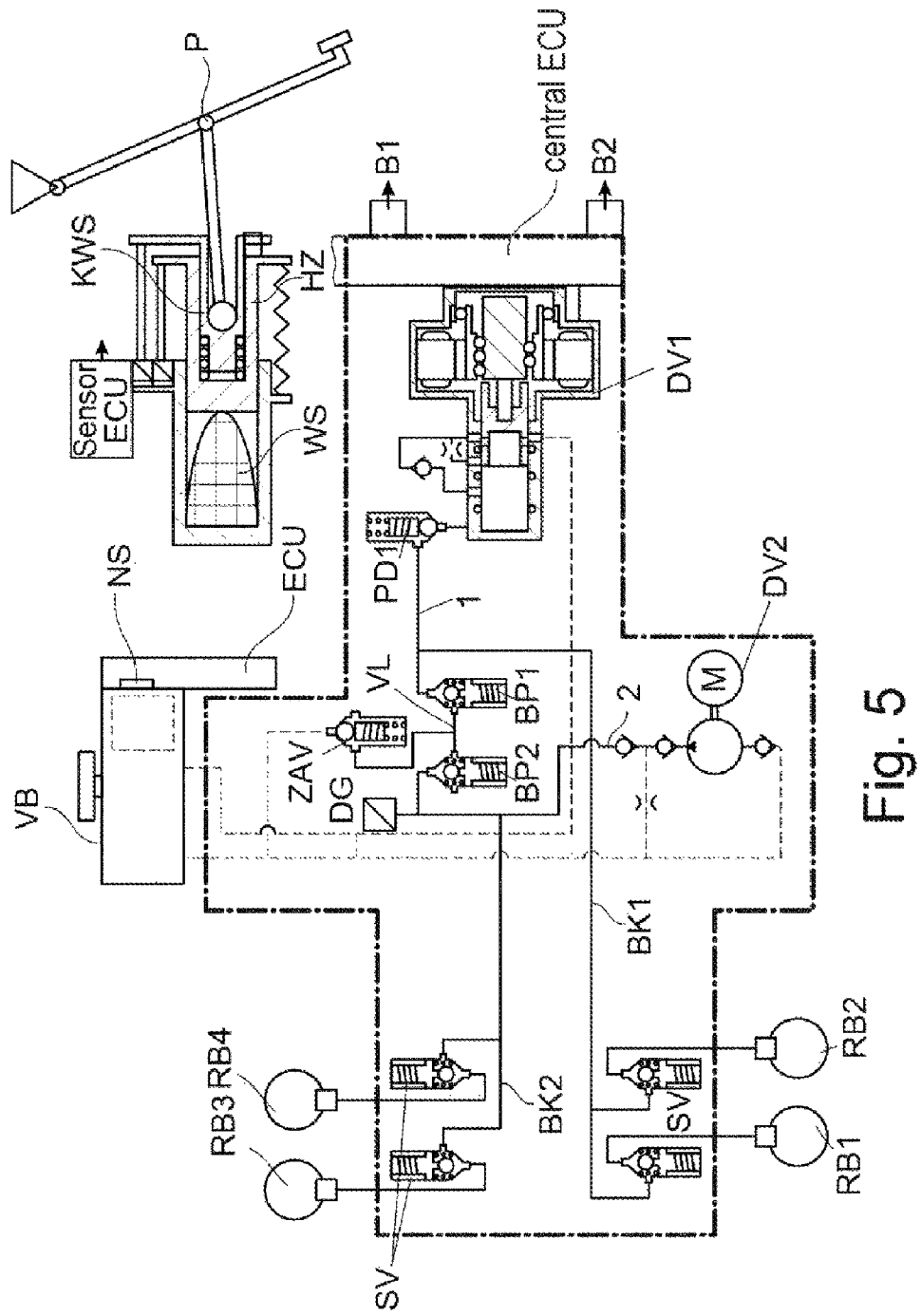

In the drawings:

FIG. 1: shows a side view of an integrated unit according to the invention with the housings A, B, C and reservoir VB and pedal interface (PI);

FIG. 2: shows the view from the front V with a section through HCU and ECU;

FIG. 3: shows a section through the master brake cylinder HZ, travel simulator WS and PI;

FIG. 4: is an illustration of the pedal stroke sensors;

FIG. 5: shows the system without a master cylinder but with a so-called electric pedal of separate construction;

FIG. 6: shows a cross-sectional illustration through the motor housing, the electronic control unit and the sensor housing;

FIG. 7: shows a space-saving schematic configuration of a reservoir;

FIG. 7a: shows the reservoir as per FIG. 7 with schematically illustrated housing of the electronic control unit and the housing for the valve arrangement;

FIG. 8: shows the unit according to the invention as per FIG. 1 with the reservoir as per FIG. 7;

FIG. 9: shows a view of the unit as per FIG. 8 from the front.

FIG. 1 shows the side view of the integrated unit housing A with valve arrangement HCU, which contains the components solenoid valve MV, pressure transducer DG, piston for pressure supply devices DV1 and DV2 and fastening of the motors of pressure supply devices DV1 and DV2. Alternatively, as already described, the housing may also be divided into housings A1 and A2. The components, such as valves, solenoid valve MV and pressure transducer DG, are preferably fastened to an extruded or continuously extruded block 24, for example the solenoid valve MV preferably by calking or clinching, which also includes the seal thereof. In the alternative, as mentioned above, housing A1 will contain the sub-block 24. Housing A2 may for example be a die-cast part without components to be calked. In the lower part, the piston 8 of the pressure supply unit DV1 with a resetting spring and housing lid 7 is shown, which is for example preferably driven by means of the motor 2 by spindle and ball screw drive KGT (not illustrated). In the case of housing A, this is screwed to the HCU block 24 via an intermediate housing 3 by means of fastening screws. In the case of the housing A2, the motor is attached without an intermediate housing. The reservoir VB is connected by way of two connections 9a and 9b to the brake circuits 1 and 2. As an extension of 9c, the suction valve SV for the pressure supply DV is positioned in the housing.

On the opposite side, the sensor housing 3 with the rotational angle sensor is connected both to motor 2 and ECU 18 via a preferably flexible circuit board (not illustrated) with the intermediate housing. Attached on the top side of the open-loop and closed-loop control unit ECU are the plug connectors, which are implemented twofold in the case of the redundant ECU. In the variant with separate master brake cylinder HZ, the corresponding connecting line to the master brake cylinder HZ is provided at 11. The reservoir VB may, in the conventional manner, comprise a level sensor (NS) with a float, wherein the target with the sensor element are arranged in the open-loop and closed-loop control unit ECU, which is preferably of redundant configuration in the case of levels 4 and 5. In the fully integrated version, the master brake cylinder HZ is arranged behind the valve arrangement block HCU, which master brake cylinder is screwed to the HCU block 24 by means of fastening screws 13.

FIG. 4 shows more details here. On the master brake cylinder HZ there is conventionally situated a flange 12 for the fastening, by means of corresponding screws 14, to the bulkhead shown by dashed lines. In the variant without master brake cylinder HZ, a simplified flange may also be used for the fastening in the assembly or engine compartment. Here, the unit should be inclined at approximately 15°, as on the bulkhead, for good ventilation. Pedal interface PI and pedal plunger 1 are connected to the master brake cylinder HZ. The connections of the valve arrangement HCU to the wheel brakes RB may be realized on the motor side or on the front side.

Here, the axis of the pressure supply device DV1 lies parallel to the master brake cylinder (HZ) axis or approximately perpendicular to the flange and the axis of the pressure supply device DV2 is perpendicular to the axis of the pressure supply device DV1. The axis $a_{DV2}$ of the piston of the pressure supply device DV2 may be both parallel to the axis $a_{DV1}$ of the pressure supply device DV1 and rotationally offset at an angle α, which advantageously shortens the structural length. As a further alternative to the described arrangement of DV2, an arrangement of $a_{DV2}$ parallel to the vertical axis may be used. In this case, a different installation location must be provided for the lower plug, for example on the opposite side of the open-loop and closed-loop control unit ECU.

FIG. 2 shows the view from the front. It is shown here that the outline contour can still be accommodated within the small vacuum vac. of 8" and is thus suitable for installation on the bulkhead. The major advantage lies in the structural width of approximately 50% of the abovementioned brake force booster BKV, which is very favorable for right-hand and left-hand drive vehicles. The structural length of the abovementioned brake force booster BKV is also considerably shorter, and thus forms a basis for widespread use of the modular concept according to the invention. Here, again, the different housings A (A1, A2), B, C and VB must be provided. The housing B is situated for example behind the HCU block 24, and is screwed to the latter and sealed off, as in the case of ABS.

The motor of the pressure supply device DV2 acts with, for example, an eccentric on the piston pump, as in the case of ABS/ESP. As is known, the structural space for this is very small. Alternatively, the motor may also drive a gear pump, which is of short construction. Arranged on the left-hand side is the ECU with housing 18 with main circuit board PCB 23, which is connected to the plug connector St situated at the top.

The solenoid valve (MV) coils are, via connecting webs 21, connected by means of press-fit contacts to the circuit board PCB 23 in the conventional manner. The connection of the connecting webs 21 to the coil wire is considered fail-safe owing to automated production with process control, but this does not necessarily apply to the contact to the PCB. The solenoid valves MV have important functions, in particular for levels 4 and 5, and are to be designed with redundant control of the drivers 20/20*r*, wherein the drivers also have an isolation switch. The contact to the circuit board PCB may likewise be of redundant configuration by way of a second contact on the connecting web 21, which is connected to a small circuit board PCB 22 with the second driver.

For cost reasons, it is advantageous to provide a 1-part circuit board PCB. For the case of an ingress of water, the circuit boards PCB may be separated by webs with seals in the housing of the open-loop and closed-loop control ECU with the two redundant circuits. Possible conductor track cracks are also advantageously covered or ruled out by redundancies. The remaining electronic connections of motor 26 to circuit board PCB 23 by means of electrical connection 15, of motor 2 to the electrical connection 16 of the motor of the pressure supply DV1, and those to rotation angle sensor 6, are also of importance. The advantage of parallel arrangement of pressure supply DV1 is the short length of the electrical connection.

FIG. 3 shows the master brake cylinder HZ with housing, in which the master brake cylinder (HZ) piston 33 and travel sensor (WS) piston with spring for the opposing force and pedal characteristic are installed. The travel simulator piston may also be accommodated in block A or housing A. The piston likewise has redundant seals 45 with throttle Dr to the interior. In the event of failure of the seal 45, the failure is identified by way of the leakage flow, and the failure is not relevant. This throttle Dr with small leakage flow allows diagnosis of the failure of the first seal. The travel simulator piston is supported on the flange 12 and therefore does not require a separate closure piece. The master brake cylinder (HZ) piston 23 with resetting spring 50 is arranged in parallel with respect to the travel simulator piston. The piston may be guided in slide rings 48 with low friction, and the sealing action of the piston is also impaired to a lesser extent in this case. Preferably, for the slide rings and seals, use is made of a separate bearing part 49, which is supported on the flange, and also the stop of the piston 23 by means of stop ring 28. A force-travel sensor KWS 30 may be arranged in the master brake cylinder (HZ) piston for the diagnosis of the travel simulator WS. The sensor rods 31 and 31*a* are connected to the piston 23 and to the pedal plunger. These rods are each connected by way of a detent coupling 32-34 to piston and pedal plunger. This coupling is composed of a ball 34 with a spring 33 in the housing 22. This prevents blockage of the pedal plunger in the event of jamming of one sensor rod.

FIG. 4 shows the arrangement of two alternative possible embodiments of the pedal travel sensors. The first variant with toothed rack 38, toothed gear 37, drive shaft 36 to the target 35 and sensor element 34 on PCB 23 has already been described in DE102015104246. This version requires little installation space and is inexpensive. In the lower variant, a guide part 39 is pressed, for example with a pin, into the sensor rod. This is guided in the upper part in a guide strip 40, in order that an angular rotation that acts on the target 41 is small. This target acts on an inductive sensor 42 with an evaluation circuit, and is connected to the main PCB 23 and is situated in the ECU housing 14.

For the above-described variants a to f, the following components may advantageously be of identical design:
Pressure supply device DV1: for all variants a to f;
Pressure supply device DV2: for all variants with redundant pressure supply;
HCU/ECU: for the two variants without redundant pressure supply;
Master brake cylinder HZ and travel sensor WS: separate and integrated with pedal sensors for five of the six variants, with the exception of variant f. without master brake cylinder. Separate master brake cylinder HZ but with additional reservoir VB.
Solenoid valve MV: for all variants
Motor sensor: for all variants.

Aside from the electric pedal corresponding to system f., all components are modular. The manufacturer and user thus have a modular system (OEM) an excellent basis inter alia for minimizing costs.

FIG. 5 shows the pressure supply devices DV1 and DV2 with valve arrangement. Here, an electric brake pedal, a so-called electric pedal, with travel simulator (WS) pedal travel sensors with a small sensor ECU and force-travel sensor KWS without a hydraulically acting master brake cylinder HZ are combined in one unit. This has advantages if the installation volume in the engine compartment is small or the noise requirements are high. Instead of the master brake cylinder HZ with reservoir VB (not shown in FIG. 5), the arrangement with pedal actuation with travel simulator WS, so-called electric pedal, may also be used. The signals of the pedal travel sensors are processed in a sensor ECU and fed to the central ECU. For level 5, a brake switch may also be used as an alternative to the electric pedal.

The abovementioned unit has the 2-circuit reservoir VB with float and level sensor NS, which may be integrated in the central open-loop and closed-loop control unit ECU. This level sensor NS should likewise be of redundant configuration and continuously measure the level, because a loss of volume owing to a leak is quickly detected in this way. Since, in this case, the connection to the master brake cylinder HZ is omitted, and thus the fall-back level with respect to the master brake cylinder HZ in the event of the failure of both pressure supply devices DV1 and DV2 and/or of the on-board electrical system is also omitted, the valves BP1 and BP2 are preferably designed as valves which are closed when electrically deenergized.

One important component of an electromotive drive is the motor sensor 34 for the electronic commutation and control of the position of the piston. The motor may be combined with different types of drive, for example transmission, trapezoid or spindle 57 with ball screw drive 58, as shown in FIG. 6.

Different types of sensors, such as segment sensors with inductive or magnetic-field-sensitive sensors, may be used, or else sensors that are arranged on the motor or transmission axis. These sensors are particularly simple in terms of construction and are composed of a sensor target, for example in the form of a two-pole or multi-pole magnet, and a magnetic field-sensitive sensor element, for example in the form of a Hall sensor, GMR sensor, or the like. This sensor element 34 is electrically connected to the electronic control unit ECU, which is mounted either directly or via an intermediate housing on the motor. The sensor element 34 is preferably arranged in a sensor housing composed of an outer housing part 52 and an inner housing part 52a, which together accommodate inter alia a circuit board 22, on which the sensor element 34 may be arranged.

According to the invention, an elastic part 61 is in order to manage the various installation tolerances between housing 18 of the electronic control unit ECU, the motor housing 62 and possibly also an intermediate housing (not illustrated) and the sensor housing 52/52a. In the extreme case, it is necessary here for tolerances in all three directions x, y, z to be compensated. This is achieved according to the invention by means of a corresponding construction and fastening of the sensor housing to the housing 18 of the electronic control unit ECU and to the motor housing. Here, the sensor housing is advantageously divided into two parts, an outer housing 52 and an inner housing 52a, wherein the housing parts 52, 52a are connected to one another by means of conventional connection techniques such as welding or adhesive bonding and are preferably manufactured from plastic. The sensor housing is furthermore fastened to the motor housing 62, preferably in two places. The sensor circuit board 22 is flexible in the upper part to the plug connector strip in order to manage the above-stated tolerances. A flex PCB (flexible circuit board), for example, is suitable for this. The electrical connection 22a from this flexible circuit board 22 to the main circuit board 23 of the electronic control unit ECU is preferably realized by means of the particularly fail-safe plug connector 51 with press-fit contacts. For assembly with the main circuit board 23, the housing 18 of the electronic control unit ECU has an aperture with a lid.

The sensor housing 52, 52a is connected and fixed to a projection of the ECU housing 18. Situated in between is an elastic part 61, which may for example be a flexible elastic seal or a seal bellows. The elastic part is preferably designed as a lip seal. This flexible and elastic seal 61 thus serves for 3-axis tolerance compensation. The electrical connection from the motor winding to the circuit board 23 is realized by means of a conventional plug-in contact.

This sensor arrangement illustrated in FIG. 6 additionally allows the measurement of the rotor eccentricity, which acts on the spindle and generates transverse forces on the piston 8. A measurement means 53, which is arranged on the rotor or the spindle nut 56 and which in the simplest case is a measurement flange or a disk, is used for measuring the rotor eccentricity. The rotor eccentricity also acts in an axial direction and can be measured using laser technology. For this purpose, the outer sensor housing part 52a has an opening 152 in its lower region 52", which opening is closed by means of a closure plug 54 after the measurement. The surface of the measurement means 53 may, on its side facing toward the outer sensor housing part 52, have markings for the measurement, be provided with a coating and/or be profiled. The lower region 52" is fastened by means of a fastening screw 55 to the motor housing 62.

FIG. 7 shows a space-saving schematic configuration of a reservoir VB, which has a front region $VB_V$, a central region $VB_M$ and a rear region $VB_H$. The front region $VB_V$ has an upper filling opening 100 which can be closed by means of the lid 101. As illustrated in FIG. 7a, the reservoir VB engages around the housing B of the electronic control unit ECU at three sides, namely its front side ECU-V, its side wall ECU-S and its back or rear side ECU-H. The back of the ECU-H faces toward the bulkhead SW. Depending on the design of the unit, the reservoir VB, as illustrated in FIG. 7a, may also lie against or engage behind the rear wall of the housing of the valve arrangement HCU.

FIGS. 8 and 9 show a side view and the front view of a unit according to the invention which, aside from the design of the reservoir VB, corresponds to the unit as illustrated and described in FIGS. 1 and 2. As can be seen from FIG. 8, the front region $VB_V$ is situated in front of the front side ECU-V of the housing B of the electronic control unit ECU, such that the filler opening is easier to reach. Since, for reasons relating to space, it is generally not sensible to arrange the entire reservoir VB in front of or adjacent to the electronic control unit ECU, the invention provides that only a narrow central region VBM extends laterally adjacent to the housing B toward the rear side of the ECU-H of the ECU, wherein the central region VBM opens there into its rear region VBH, which is much larger in terms of volume and which is arranged behind the housing B of the electronic control unit ECU. It is self-evidently also possible for the reservoir VB to also overlap the housing B of the ECU. If the bulkhead SW is arranged at an angle q with respect to the vertical, the front region VBV of the reservoir VB should be designed such that the surface normal of the filling opening 100 is oriented vertically.

LIST OF REFERENCE DESIGNATIONS

HZ Master brake cylinder (single)
$a_{HZ}$ Main axis of the master brake cylinder
$a_{DV1}$ Axis of the first pressure supply device DV1

$a1_{DV2}$ Horizontal orientation of the axis of the second pressure supply device DV2 perpendicular to the axis $a_{DV1}$ of the first pressure supply device DV1
$a2_{DV2}$ Vertical orientation of the axis of the second pressure supply device DV2 perpendicular to the axis $a_{DV1}$ of the first pressure supply device DV1
DV Pressure supply
HCU Hydraulic control unit
ECU Electronic computing unit
ECU-V Front side of the ECU
ECU-S Side wall of the ECU
ECU-O Top side of the ECU
ECU-H Rear side of the ECU, facing the bulkhead of the vehicle
PI Pedal interface
SW/H Bulkhead/bracket
St Plug connector
BKV Brake force booster
NS Level sensor
RZ Wheel cylinder
MV Solenoid valve
Dr Throttle
SV Suction valve of pressure supply device DV1
A Housing for HCU and pressure supply device DV1 and optionally
pressure supply device DV2
A1 Partial housing for HCU and DV2
A2 Partial housing for pressure supply device DV1
B Housing for ECU
C Housing for master brake cylinder HZ and travel simulator WS with flange
$a_{DV1}$ Motor axis of DV1
$a_{DV2}$ Motor axis of DV2
$a_{HZ}$ Longitudinal axis of master brake cylinder HZ
VB Reservoir
$VB_H$ Rear region of the reservoir
$VB_M$ Central region of the reservoir
$VB_V$ Front region of the reservoir
1 Pedal plunger
2 Motor
3 Intermediate housing
4 Fastening screw
5 Sensor housing
6 Rotation angle sensor
7 Closure lid
8 Piston
9a/9b Connections to the reservoir VB
10 Connections to the wheel cylinder RZ
11 Connection to the master brake cylinder HZ
12 Flange of master brake cylinder HZ
13 Fastening screw
14 Fastening screw to bulkhead or bracket
15 Electrical connection motor between pressure supply device DV2 and ECU
16 Electrical connection of pressure supply device DV1 motor
17 Electrical connection of rotational angle sensor
18 ECU housing
19 Web with seal
20 Driver for solenoid valve MV
21 Connection web of solenoid valve MV
22 Small PCB
22a Electrical connection of the main PCB to the PCB 22 of the ECU
23 Main PCB
24 HCU block
25 Bore for eccentric piston pump DV2
26 Motor for pressure supply device DV2
27 Outline contour 8", vacuum brake force booster BKV
28 Stop ring for piston
29 Line to the reservoir VB
30 Force-travel sensor KWS
31/31a Pedal rod
32 Spring housing
33 Master brake cylinder (HZ) piston
34 Sensor element
35 Target
36 Drive shaft
37 Toothed gear
38 Toothed rack
39 Guide part
40 Guide rail
41 Target
42 Inductive sensor
43 Master brake cylinder (HZ) housing
44 Travel sensor (WS) piston
44a Travel sensor (WS) spring
45 Travel sensor (WS) seal
46 Slide ring
47 Connecting bores travel sensor (WS)-master brake cylinder (HZ) and HCU block 24
48 Slide rings
49 Bearing part
50 Resetting spring
51 Plug connector strip with press-fit contacts
52 Sensor housing 1
52a Sensor housing 2
53 Measurement flange
54 Closure plug
55 Fastening, sensor housing
56 Threaded nut
57 Threaded spindle
58 Ball-screw drive KGT
59 Piston
60 Motor contact to ECU
61 Housing seal
62 Motor housing
63 Motor bearing
64 Rotor
100 Opening of the reservoir
101 Closure lid of the reservoir
152 Closable opening

What is claimed is:

1. An actuating device for a hydraulically acting brake system, comprising the following components:
   a first housing comprising any of the following: a master brake cylinder having at least one piston enabled to be acted on with force by a brake pedal; a travel simulator of an electronic brake pedal; or a brake switch for fully automated driving,
   one or more pressure supply devices, wherein at least one of the pressure supply devices is a piston-cylinder unit driven by an electromotive drive or is a double-action piston pump driven by an electromotive drive, wherein the electromotive drive is arranged to adjust the piston of the piston pump or double-action piston pump directly or via a transmission gear,
   one or more valve arrangements with solenoid valves,
   one or more electronic open-loop and closed-loop control units,
   wherein the brake system has at least two hydraulic circuits, and wherein a pressure change is enabled to be performed, using a pressure supply device of the one or more pressure supply devices, in at least one wheel brake assigned to one of the hydraulic circuits, wherein at least one of the one or more valve arrangements and at least one piston and pressure chamber of at least one of the one or more pressure supply devices are arranged in a second housing, and wherein the second housing is connected to the first housing;

wherein the actuating device is a 2-box solution with two modules, wherein:

the first module comprises at least one of the one or more pressure supply devices, at least one of the one or more valve arrangements, at least one of the one or more open-loop and closed-loop control units and a reservoir, wherein the at least one of the one or more open-loop and closed-loop control units is of fully or partially redundant configuration; and the second module comprises the first housing;

wherein the actuating device further comprises a further pressure supply device with continuous delivery action, wherein the further pressure supply device is arranged either in the second housing or in a further housing, together with an associated valve arrangement;

wherein the first module comprises an electronic control unit (ECU) housing comprising at least one of the one or more open-loop and closed-loop control units and having two mutually separate on-board electrical system connections, one for the at least one pressure supply device and the other one for the further pressure supply device.

2. The actuating device as claimed in claim 1, wherein the master brake cylinder is a single master brake cylinder with only a single piston, wherein the piston delimits only one pressure chamber and the piston is enabled to be acted on with force by the actuating device.

3. The actuating device as claimed in claim 1, wherein the second module comprises the electronic brake pedal with travel simulator and travel simulator pedal travel sensors with a sensor electronic control unit (ECU) and force-travel sensor.

4. The actuating device as claimed in claim 1, wherein:
the electromotive drive of at least one of the one or more pressure supply devices includes a motor with redundant winding systems with 2×3 phase connection;
the actuating device further comprises a redundant connection, via a redundant circuit board; or
the actuating device further comprises a redundant driver for a coil of a solenoid valve.

5. The actuating device as claimed in claim 1, wherein hydraulic pressure chamber or hydraulic pressure chambers of the one or more pressure supply devices and the one or more valve arrangement with solenoid valves, as well as hydraulic lines, hydraulic pistons and hydraulic chambers, are arranged in one housing or a maximum of two directly adjacent hydraulically connected housings, which together form a unit.

6. The actuating device as claimed in claim 1, wherein a longitudinal axis of a first pressure supply device of the one or more pressure supply devices is arranged perpendicularly with respect to a longitudinal axis of a second pressure supply device of the one or more pressure supply devices, and/or the longitudinal axis of the second pressure supply device is arranged vertically.

7. The actuating device as claimed in claim 1, wherein at least one of the one or more pressure supply devices is a pump with continuous delivery action, in the form of a gear pump or an eccentric piston pump, which is driven by an electromotive drive.

8. The actuating device as claimed in claim 1, wherein a first pressure supply device of the one or more pressure supply devices assists a second pressure supply device of the one or more pressure supply devices in a case of a rapid pressure build-up or a pressure build-up above 120 bar; the first pressure supply device supplies pressure in an event of fading for anti-lock braking system (ABS) function; and/or, in an event of failure of the second pressure supply device, jointly performs the function of the second pressure supply device.

9. The actuating device as claimed in claim 8, wherein the first pressure supply device performs pressure build-up for pressure ranges lower than or equal to 120 bar and for the ABS function.

10. The actuating device as claimed in claim 8, wherein, in the event of failure of the first pressure supply device, only a maximum pressure of 120 bar is available by means of the second pressure supply device.

11. The actuating device as claimed in claim 1, wherein pressure modulation for ABS function in wheel brakes of a brake circuit using a pressure supply device, of the one or more pressure supply devices, assigned to the brake circuit is performed in multiplex operation, wherein volumes of a hydraulic fluid are adjusted, for the purposes of pressure setting, using a piston of the pressure supply device.

12. The actuating device as claimed in claim 1, further comprising at least one hydraulic main line, wherein the at least one hydraulic main line is connectable via a discharge valve to the reservoir, and/or wherein a connecting line is connectable via a central discharge valve to the reservoir.

13. The actuating device as claimed in claim 1, wherein a sensor target is connected to a rotor or to a threaded part which is rotatable about a longitudinal axis of the pressure supply device, and wherein a sensor element is arranged in a sensor housing, wherein the sensor housing:
is connected by means of an elastic connection to the ECU housing, and/or
has an inner housing part and an outer housing part, wherein at least one of the inner housing part or the outer housing part is connected to the ECU housing, wherein an elastic part or at least one spring pushes one or more regions of the at least one of the inner housing part or the outer housing part against a region of the ECU housing.

14. The actuating device as claimed in claim 13, wherein the ECU housing has a front side, a top side, a side wall, and a rear side, wherein the reservoir is arranged on the ECU or so as to be spaced apart therefrom, wherein the reservoir has an opening, which is closable by means of a lid, for the filling of hydraulic medium, wherein the opening is arranged in front of the front side of the ECU housing, wherein the reservoir engages around the ECU housing from at least two sides or extends at least partially along the at least two sides.

15. The actuating device as claimed in claim 1, wherein the ECU housing comprises a plug connector to an on-board electrical system of a vehicle arranged above at least one of the one or more valve arrangements, and wherein the plug connector shows above the at least one valve arrangement.

16. The actuating device as claimed in claim 1, wherein the ECU housing comprises two plug connectors to an on-board electrical system of a vehicle.

17. The actuating device as claimed in claim 1, wherein at least one of the one or more pressure supply devices is provided per hydraulic circuit.

18. The actuating device as claimed in claim 16, wherein each of the two plug connectors is arranged above at least one of the one or more valve arrangements, and wherein each of the plug connectors is disposed vertically above the at least one of the one or more valve arrangements.

19. The actuating device as claimed in claim 16, wherein each of the two plug connectors has its own energy supply.

20. The actuating device as claimed in claim 16, wherein the two plug connectors face into a common direction.

21. The actuating device as claimed in claim 20, wherein the two plug connectors are arranged in such a way that plugs in the two plug connectors are enabled to be pulled in a common direction.

22. The actuating device as claimed in claim 1, wherein the ECU housing is arranged on a lateral side of the second housing.

23. The actuating device as claimed in claim 22, wherein at least one open-loop and closed-loop control unit in the ECU housing connects to the one or more valve arrangements with solenoid valves.

* * * * *